United States Patent [19]
Mita

[11] Patent Number: 5,973,707
[45] Date of Patent: *Oct. 26, 1999

[54] SCAN CONVERTING METHOD AND APPARATUS FOR RASTER TO BLOCK AND BLOCK TO RASTER USING A SHARED BLOCK BUFFER AND TWO INPUT/OUTPUT BUFFERS, ONE BEING RASTER, THE OTHER SCAN

[75] Inventor: Yoshinobu Mita, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/571,194

[22] Filed: Dec. 12, 1995

[30] Foreign Application Priority Data

Dec. 16, 1994 [JP] Japan .................................. 6-313065

[51] Int. Cl.$^6$ .............................. G09G 5/00; H04N 5/66; H04N 1/40
[52] U.S. Cl. ........................... 345/516; 348/420; 358/445
[58] Field of Search ..................... 345/200, 193, 345/190, 196, 516, 526, 507; 358/433, 426, 445; 348/420, 403; 395/115, 114; 382/248, 250

[56] References Cited

U.S. PATENT DOCUMENTS

| | | | |
|---|---|---|---|
| 4,933,763 | 6/1990 | Chantelou | 348/420 |
| 5,226,093 | 7/1993 | Iwase | 348/420 |
| 5,337,049 | 8/1994 | Shimoda | 348/420 |
| 5,359,694 | 10/1994 | Concordel | 358/445 |
| 5,446,560 | 8/1995 | Schwartz | 358/445 |
| 5,504,842 | 4/1996 | Gentile | 395/114 |
| 5,563,662 | 10/1996 | Kishi | 348/420 |

*Primary Examiner*—Jeffery Brier
*Assistant Examiner*—Paul A. Bell
*Attorney, Agent, or Firm*—Fitzpatrick, Cella, Harper & Scinto

[57] ABSTRACT

A scan converting method of converting image data from a raster sequence scan to a block sequence scan to divide the image data into blocks each having predetermined vertical width and lateral width and converting the image data from the block sequence scan to the raster sequence scan. One block buffer having a size in which a vertical width is set to the vertical width of the block and a lateral width is set to the horizontal width of the raster is used. Raster data by the raster sequence scan is written into the block buffer. The block data by the block sequence scan is read out. The block data is written and the raster data is read out. Upon conversion from the raster sequence scan to the block sequence scan, the block buffer is read out by the block sequence scan, the raster data is written into empty addresses which are caused by the reading, and the read address by the next block sequence scan is obtained by a predetermined arithmetic operation on the basis of the order of writing. Upon conversion from the block sequence scan to the raster sequence scan, the block buffer is read out by the raster sequence scan, the block data is written into empty addresses which are caused by the reading, and the read address by the next raster sequence scan is obtained by a predetermined arithmetic operation on the basis of the order of writing.

6 Claims, 9 Drawing Sheets

FIG. 1A PRIOR ART

RASTER SEQUENCE

FIG. 1B PRIOR ART

BLOCK SEQUENCE

FIG. 1C PRIOR ART

BLOCK BUFFER

RASTER SEQUENCE

BLOCK SEQUENCE

SCAN CONVERTING METHOD AND APPARATUS FOR RASTER TO BLOCK AND BLOCK TO RASTER USING A SHARED BLOCK BUFFER AND TWO INPUT/OUTPUT BUFFERS, ONE BEING RASTER, THE OTHER SCAN

BACKGROUND OF THE INVENTION

1. Field of the Invention

The invention relates to scan converting methods and apparatus for performing a scan conversion between a raster sequence scan and a block sequence scan which are executed at the time of various image processes, such as image compressing and expanding process, and the like in a television, a scanner, a printer, and the like.

2. Related Background Art

Figure 1A:
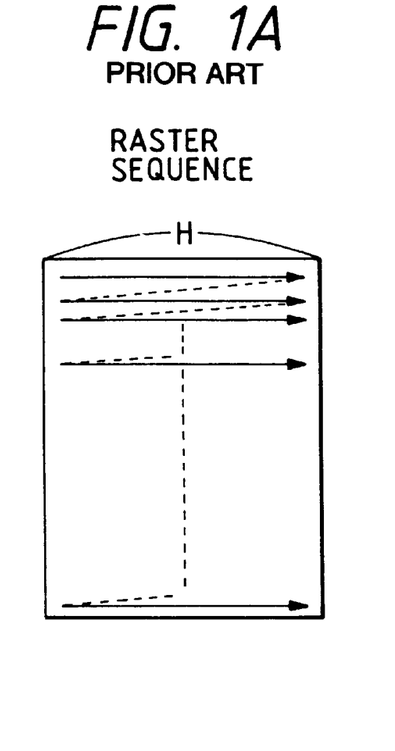
FIGS. 1A to 1C are explanatory diagrams showing a conventional raster/block converting method.
Figure 1B:
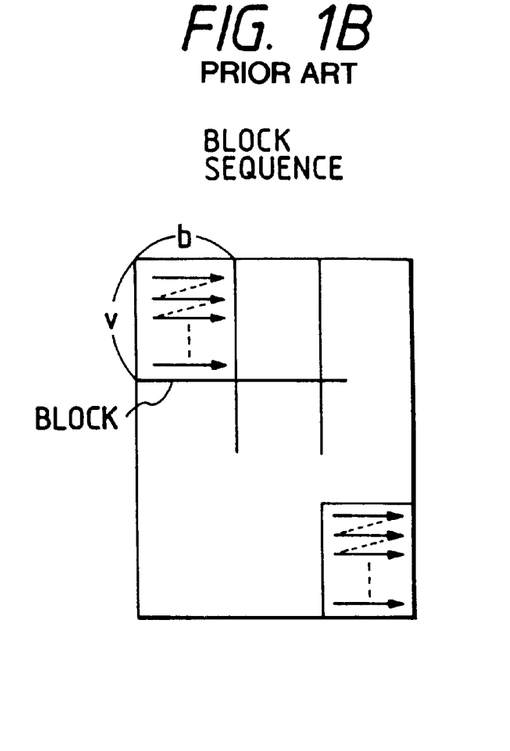
Figure 1C:
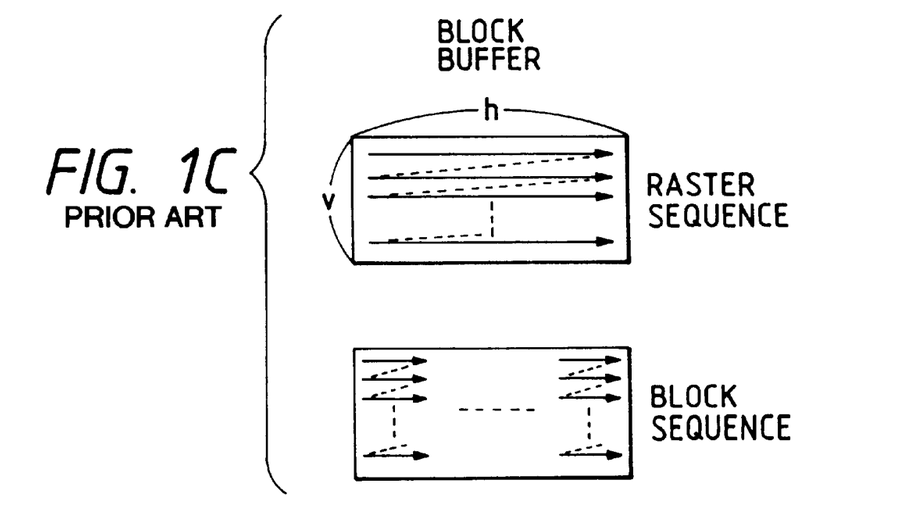

Hitherto, in case of performing a JPEG system image compressing process or the like such as to image process image data every block, it is necessary to convert an order of scanning from an ordinary raster scan sequence of an image as shown in FIG. 1A to a block scan sequence as shown in FIG. 1B. In case of expanding the image, contrarily, it is necessary to reversely convert the scanning order from the block sequence to the raster sequence. For this purpose, as shown in FIG. 1C, two block buffers are provided and are switched. Namely, when converting from the raster sequence to the block sequence, one block buffer is written in accordance with the raster sequence and the other block buffer is read out in accordance with the block sequence. When reversely converting from the block sequence to the raster sequence, one block buffer is written in accordance with the block sequence and the other block buffer is read out in accordance with the raster sequence.

Figure 2:
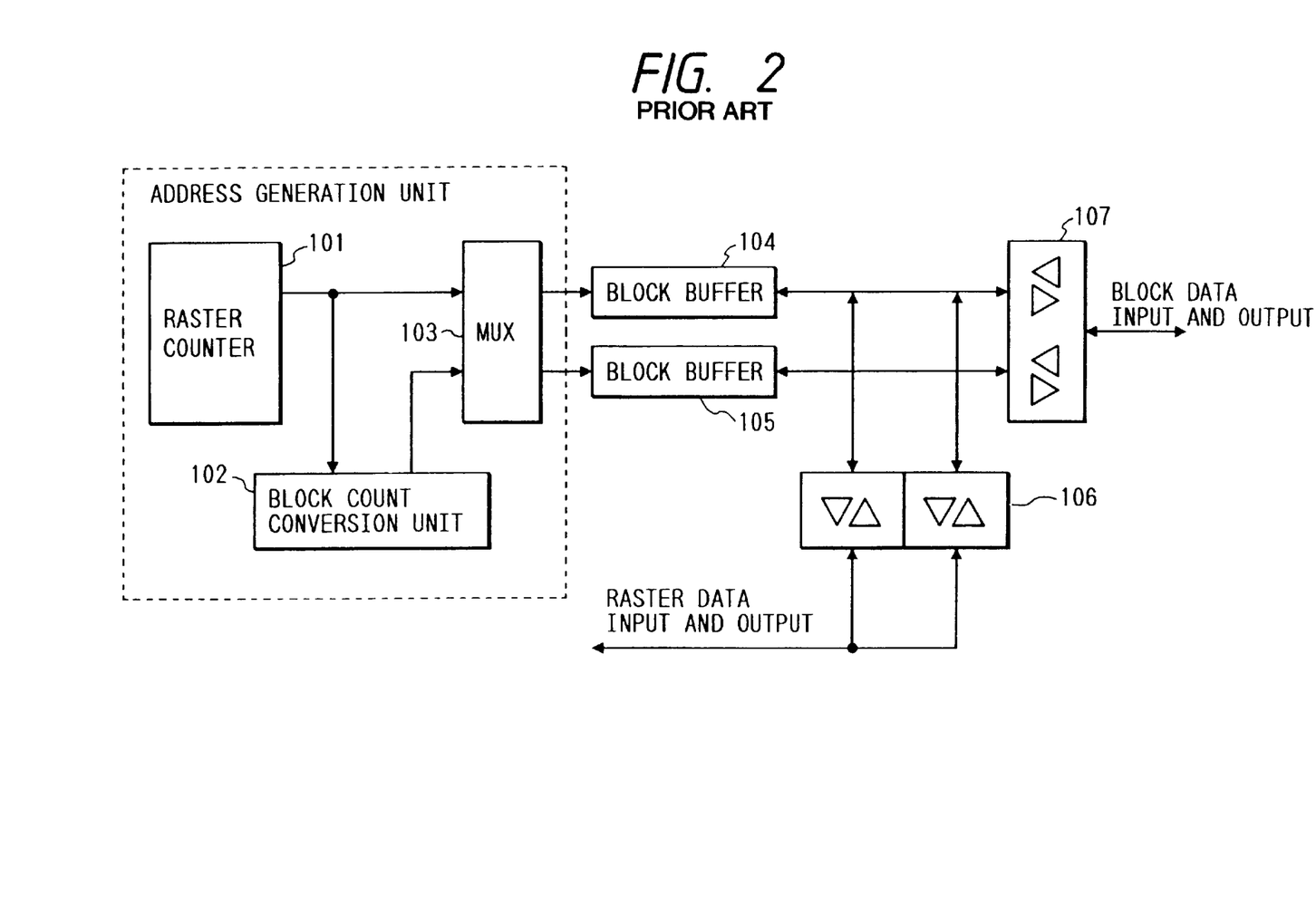
FIG. 2 is a block diagram showing a conventional scan converting apparatus.

FIG. 2 is a block diagram showing a conventional scan converting apparatus.

In FIG. 2, a raster counter 101 generates an ordinary address for a raster sequence (hereinafter, referred to as a raster address). A block count conversion unit 102 converts the raster address into an address for a block sequence (hereinafter, referred to as a block address). The above two addresses are switched by a multiplexer 103 in accordance with the conversion or reverse conversion and are supplied to two block buffers 104 and 105, respectively. Input/output data is transmitted and received through input/output buffers 106 and 107.

Namely, when converting from the raster sequence to the block sequence, the I/O buffer 106 inputs raster data from the outside such as a camera or the like and is divided into blocks by using the block buffers 104 and 105, and the block data is outputted from the I/O buffer 107 to an image compressing unit or the like. Upon reverse conversion, the expanded block data is inputted to the I/O buffer 107 and is converted to the data of the raster sequence by using the block buffers 104 and 105 and is outputted as raster data from the I/O buffer 106 to a monitor or the like.

Figure 3:
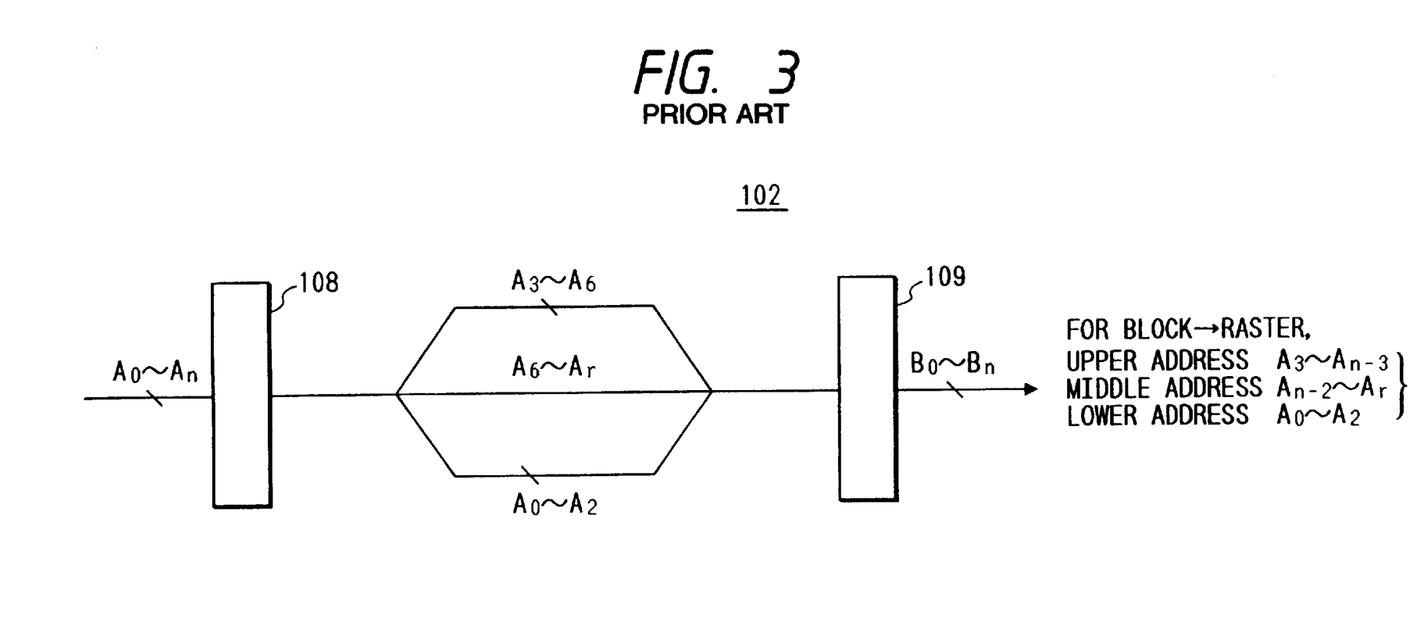
FIG. 3 is a block diagram showing a conventional block count conversion unit.

FIG. 3 shows a construction of the block count conversion unit 102. In this instance, FIG. 3 shows a case of pixels in which a size of one block comprises 8 pixels (in the vertical direction)×8 pixels (in the lateral direction).

In FIG. 3, raster addresses which are advanced one by one to ordinary addresses $A_0$ to $A_n$ from the raster counter 101 are received, address lines of $A_3$ to $A_6$ are replaced to upper addresses and are converted to addresses such that middle addresses are set to $A_6$ to $A_r$ and lower addresses are set to $A_0$ to $A_2$, and those addresses are outputted as block addresses $B_0$ to $B_n$ from an output buffer 109.

Namely, after the addresses of $A_0$ to $A_6$ were counted up to "8" in the horizontal direction, the addresses are again counted to "8" with respect to the next line. By repetitively executing the above operations with respect to eight lines, block addresses of one block are obtained. By continuing those operations for 1H, block addresses of one block buffer are derived.

As block addresses in the reverse conversion, the block addresses obtained by converting the upper addresses, middle addresses, and lower addresses of $A_0$ to $A_n$ into $A_3$ to $A_{n-3}$, $A_{n-2}$, to $A_r$, and $A_0$ to $A_2$ are used.

Therefore, the addresses of lower three bits of $A_0$ to $A_2$ (corresponding to eight pixels) don't always need to be converted. In the above case, it is necessary to set a condition such that the addresses of a horizontal width (1H) of the block buffer are the power of "2".

In the conventional apparatus mentioned above, however, two sets of block buffers 104 and 105 are necessary, so that a circuit scale is large in proportion to the number of horizontal pixels of a picture plane. Particularly, as compared with the number of pixels of an image to monitor, since the number of horizontal pixels of an image which is handled by a scanner, printer, or the like of a high resolution is extraordinarily large, a scale of the block buffer is very large. When the block buffers are accessed, circuits for producing two kinds of addresses of the raster sequence and block sequence are necessary. There is a problem such that in order to switch each of the block buffers to the raster sequence and the block sequence, a circuit such as a multiplexer or the like to switch two kinds of addresses, a switching circuit such as input/output buffers 106 and 107 or the like to alternately supply the data to the two block buffers or to alternately extract the data from the two block buffers, and the like are necessary, so that in addition to those circuits, a whole circuit scale is extremely large.

SUMMARY OF THE INVENTION

The invention is made to solve the problems as mentioned above and it is an object of the invention to provide scan converting methods and apparatus which can perform the foregoing scan conversion by using only one block buffer.

According to an embodiment of the invention, when converting from a raster sequence scan to a block sequence scan, data is read out from a block buffer by the block sequence scan, the raster data is written into empty addresses which are caused by the reading, addresses when reading out by the next block sequence scan are obtained by a predetermined arithmetic operation on the basis of the order of writing, and when converting from the block sequence scan to the raster sequence scan, the data is read out from the block buffer by the raster sequence scan, the block data is written into empty addresses which are caused by the reading, and addresses when the pixels are again read out by the raster sequence scan are arithmetically operated on the basis of the order of writing.

According to the embodiment, the address arithmetic operation to convert from the raster sequence scan to the block sequence scan and t he address arithmetic operation to convert from the block sequence scan to the raster sequence scan can be executed by the same circuit and it is sufficient to use only one block buffer, so that the circuit scale can be reduced.

The above and other objects and features of the present invention will become apparent from the following detailed description and the appended claims with reference to the accompanying drawings.

DETAILED DESCRIPTION OF THE PREFERRED EMBODIMENTS

Figure 4:
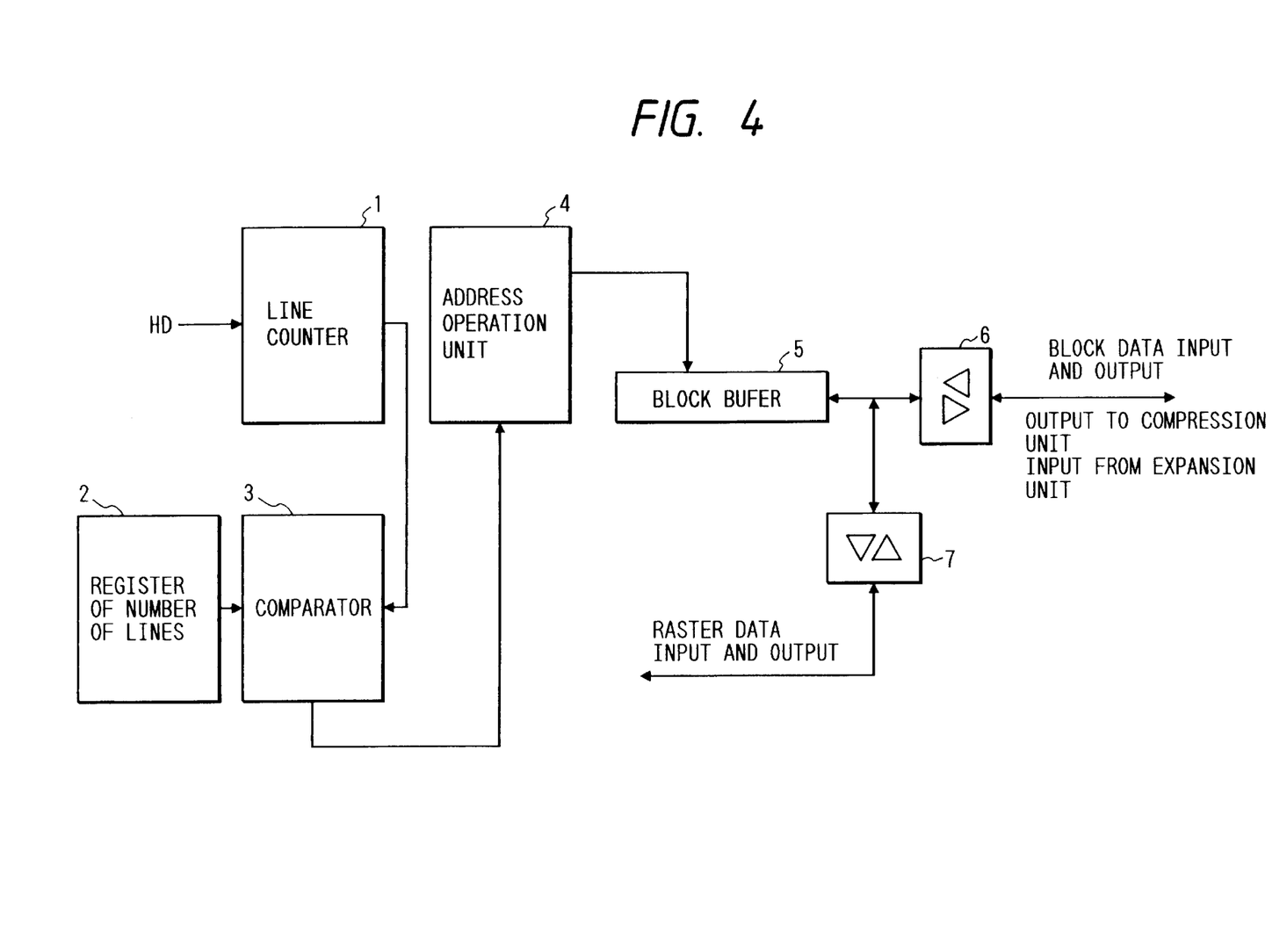
FIG. 4 is a block diagram showing an embodiment of the invention.

FIG. 4 is a block diagram showing an embodiment of the invention. In FIG. 4, a line counter 1 is a counter to count the number of input lines from a horizonal sync signal HD of a raster sequence or the like. A register 2 of number of lines stores the number of pixels in the vertical direction of a block size, namely, the number of lines. A comparator 3 compares a value of the line number register 2 with a count value of the line counter 1, thereby judging a delimiter of processes corresponding to a capacity of a block buffer. An address operation unit 4 arithmetically operates and outputs an address to be given to a block buffer 5 in accordance with the result of judgment of the comparator 3. Buffers 6 and 7 are connected to data input/output lines of the block buffer 5. Directions of buffering and enable states when reading and writing for the same address are determined.

Figure 5:
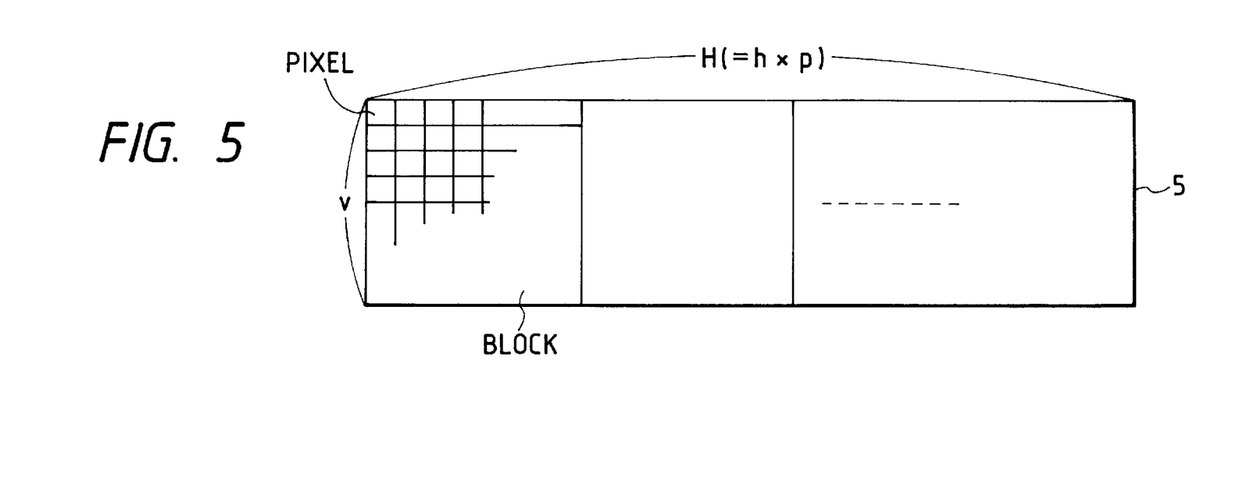
FIG. 5 is a constructional diagram showing an example of a construction of a block buffer.

FIG. 5 shows a construction of the block buffer 5. A horizontal width H denotes the number (h·p) of pixels (it is now assumed that the number is a power of "2"). A vertical width denotes the number (v) of pixels (the number of lines). The block buffer 5 is constructed by using an SRAM.

When converting from a raster sequence to a block sequence, the buffer 7 inputs raster data and the buffer 6 outputs block data from the block buffer 5. When reversely converting from the block sequence to the raster sequence, the buffer 6 inputs the block data and supplies to the block buffer 5 and the buffer 7 receives the output of the block buffer 5 and generates the raster data.

Figure 6:
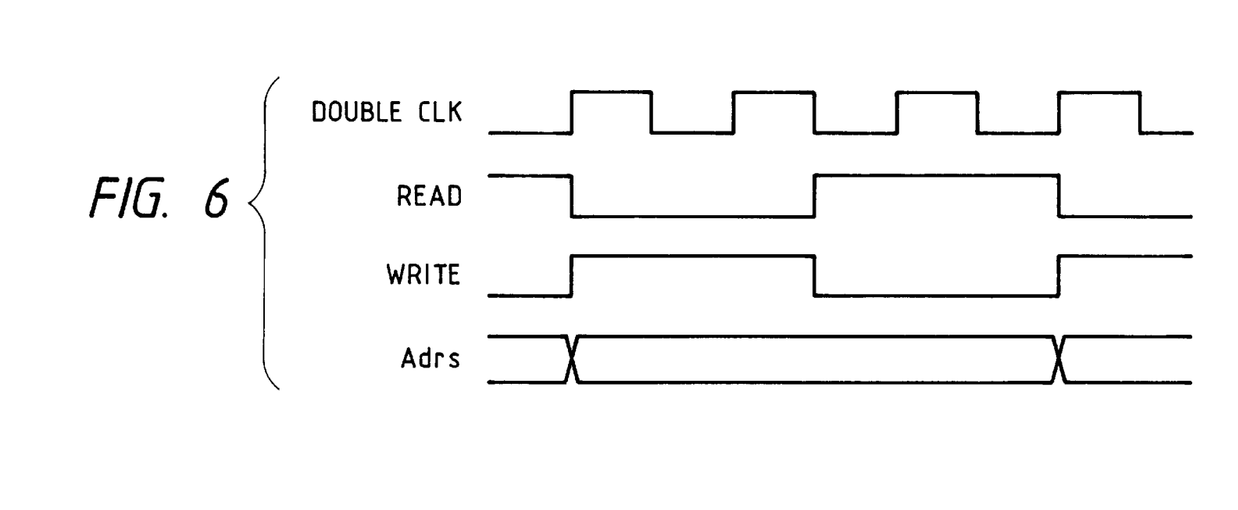
FIG. 6 is a timing chart showing an order of accessing of the block buffer.

FIG. 6 shows conversion timings of the above two cases. For an address Adrs which is given to the block buffer 5, the reading operation is performed in the former half and the writing operation is executed into empty addresses which are caused by the reading. Thus, as a capacity of the block buffer 5, it is sufficient to use a buffer capacity of (the vertical pixel width)×(horizontal line width) of a block which is necessary. In the block buffer 5, after only the writing operation corresponding to the block width was first performed, the reading operation is executed.

A principle of the invention will now be described. Although the block size is set to p pixels (in the horizontal direction)×v pixels (in the vertical direction), the p pixels in the horizontal direction are accessed in accordance with the horizontal order in the same manner in the scan conversion in each of the above two cases. Therefore, it is assumed that p=1 in a part of the following description.

The conversion from the raster sequence to the block sequence will be first explained.

Figure 7A:
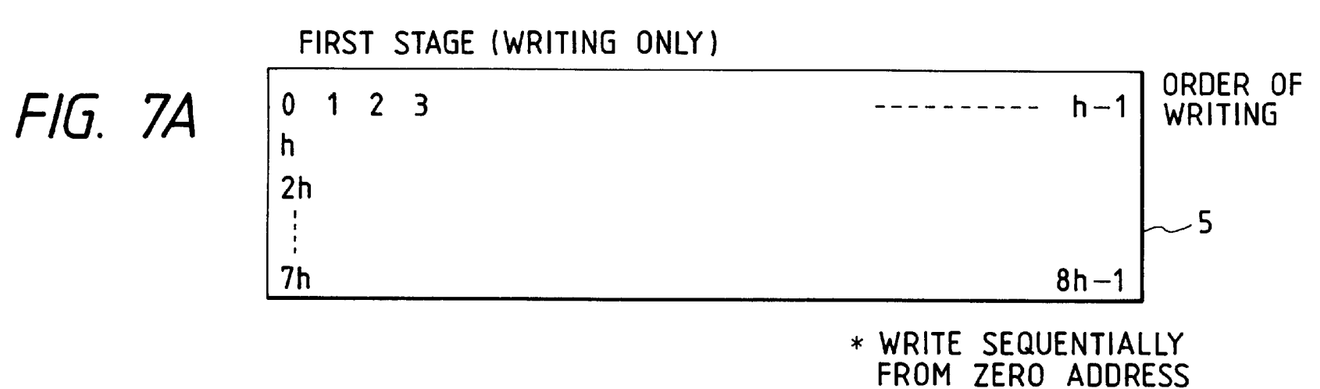
FIGS. 7A and 7B are explanatory diagrams showing orders of accessing of the block buffer.

Now, assuming that the block size is set to (p×v) and p=1 and v=8, as shown in FIG. 7A, the order of writing of the raster data to the block buffer 5 is as shown in 0 to 8h−1 and they correspond to addresses of the block buffer 5 as they are. In this case, the number of pixels in the horizontal direction is set to h. The (8×h) writing operations of one block as mentioned above are set to the first stage.

Figure 7B:
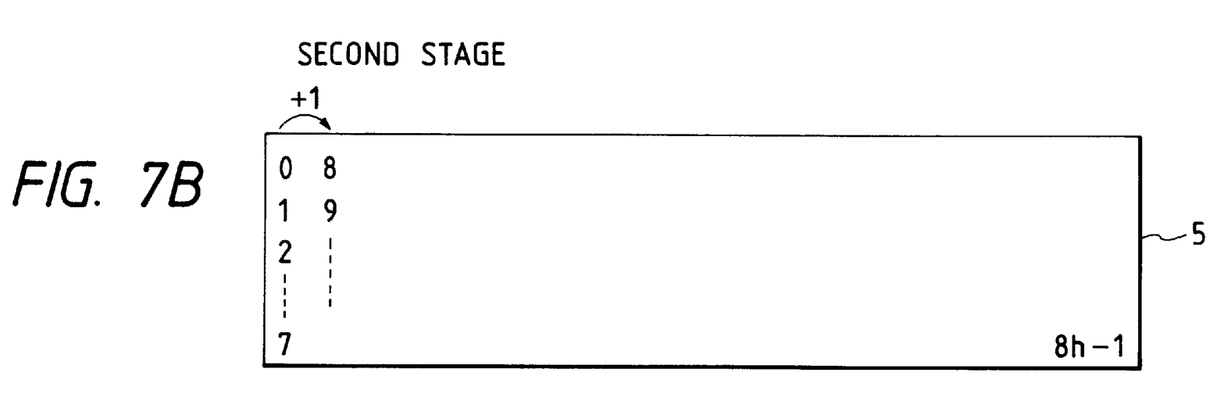

In the second stage, subsequently, as shown in FIG. 7B, in order to read out the data every (1×8) blocks, the block data is derived by reading at intervals of h addresses. The next raster data is written into the empty addresses which are caused after they were read out. Therefore, an address Adrs at this time is set to [Adrs+step (step=h)]. Actually, when the address exceeds the maximum address (v×h), it is shifted to an adjacent block. Therefore, in this case, after the maximum address was subtracted from the address, it is increased by "+1". That is, Adrs=[Adrs+step+(v×h)+1] (v=8, step=h). Actually, even at the first stage, the access address Adrs is obtained by assuming that (step=1) in a manner similar to the above.

As mentioned above, after completion of the access of 8h(v×h) at the second stage, the process is shifted to the next stage. At the subsequent stages, in a manner similar to the above, the data is read out in accordance with the order of addresses every hth writing operation of the previous stage. Therefore, the reading operation starts from the zero address and is executed at intervals of step (=step×h). Namely, at the third stage, step=h×h.

If step≧8h, step=step−8h+1. The process is repeated until step<8h. Since this method has many repetition, if another obtaining method is pursued, the final step is substituted by the following equations.

$$a = (\text{step} \times h)  8h$$
$$b = (\text{step} \times h) \% 8h \quad (1)$$
$$\text{step} = a + b$$

where, "step" of the right side is a step of the previous stage and % indicates a calculation to obtain a remainder.

The above rules will be summarized as follows.

Address arithmetic operation rule in the address operation unit 4:

Now, assuming that the block size is set to p×v, the length H of horizontal line=h×p, and the upper address is set to Adrs, the lower address is a counter output of a p-adic notation.

[A] Initial value step=1, Adrs=0

... the first stage $$\text{Adrs} = \text{Adrs} + \text{step}$$

where, if Adrs≧h×v, Adrs=Adrs−h×v+1

[B] After the second stage $$\text{step} = \text{step} \times h, \text{ if step} \geq h \times v, \text{ step} = a + b$$

where, a=(step×h)/(h×v)=step/v
(the remainder is omitted)
b=(step×h)%(h×v)=h×(step−v×a)

Adrs=Adrs+step

If Adrs≧h×v, Adrs=Adrs-h×v+1 where, an arithmetic operation to obtain the step is performed only once at the beginning of each stage. The address Adrs is updated every p count as a lower address. The address Adrs and the lower address are added, thereby producing the final address.

The conversion from the block sequence to the raster sequence is also the same as that mentioned above in principle and can be realized by exchanging h and v in the foregoing arithmetic operation rule. Therefore, its details are omitted.

Figure 8:
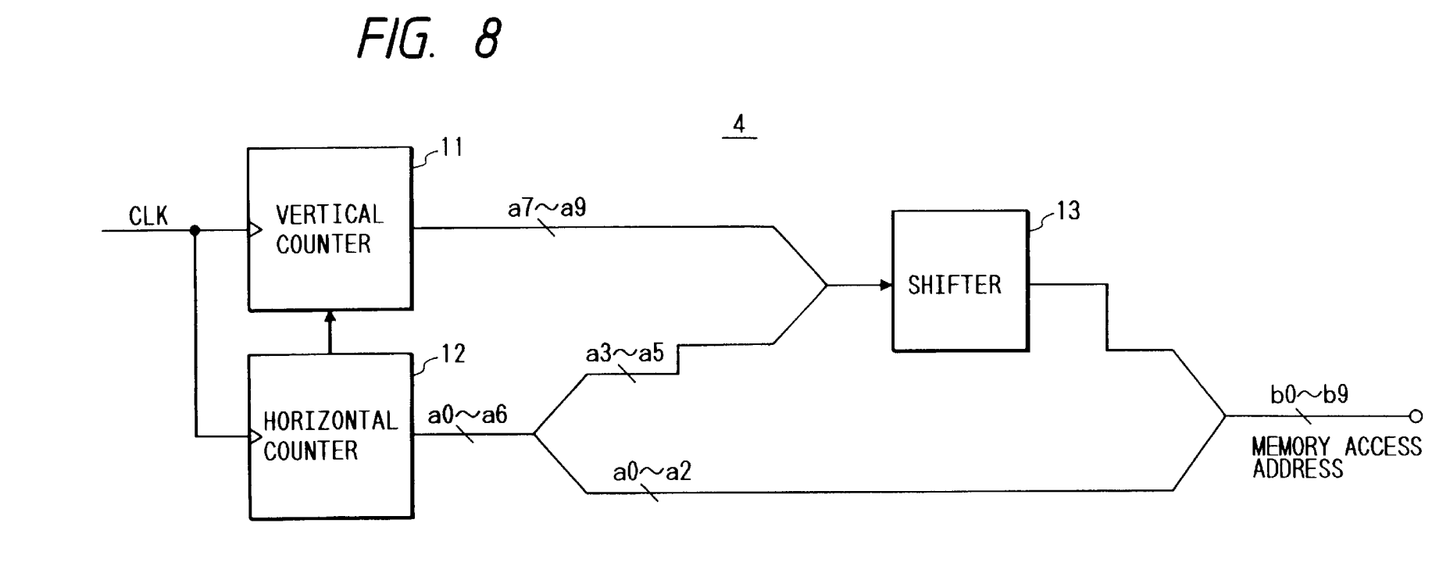
FIG. 8 is a block diagram showing an example of a construction of an address operation unit.

FIG. 8 shows an example of a construction of the address operation unit 4 according to the above principle. It is now assumed that the number of horizontal pixels of the block is the power of "2".

In FIG. 8, a horizontal counter 12 and a vertical counter 11 count up by a clock CLK synchronously with an input/output of pixel data. In this case, the vertical counter 11 operates only when a carry signal of the horizontal counter 12 is received and counts up. In the embodiment, a width in the horizontal direction is set to 7 bits and 128 pixels and a vertical width of the block is set to 3 bits and 8 pixels. Now, assuming that the size of one block is set to 8×8, lower three bits $a_0$ to $a_2$ of addresses which are produced are not influenced at all. Therefore, upper addresses $a_3$ to $a_8$ of the horizontal counter 12 and output addresses $a_7$ to $a_9$ of the vertical counter 11 are converted.

$a_3$ to $a_9$ in each of the counter outputs are inputted to a shifter 13 as a conversion circuit and a shifting operation shown in the following Table 1 is executed.

TABLE 1

| 1 | 2 | 3 | 4 | |
|---|---|---|---|---|
| $a_9$ | $a_5$ | $a_8$ | $a_4$ | ... vertical addresses |
| $a_8$ | $a_4$ | $a_7$ | $a_3$ | |
| $a_7$ | $a_3$ | $a_6$ | $a_9$ | |
| $a_6$ | $a_9$ | $a_5$ | $a_8$ | upper horizontal addresses |
| $a_5$ | $a_8$ | $a_4$ | $a_7$ | |
| $a_4$ | $a_7$ | $a_3$ | $a_6$ | |
| $a_3$ | $a_6$ | $a_9$ | $a_5$ | |
| $a_2$ | $a_2$ | $a_2$ | $a_2$ | lowest addresses |
| $a_1$ | $a_1$ | $a_1$ | $a_1$ | (horizontal addresses) |
| $a_0$ | $a_0$ | $a_0$ | $a_0$ | |
| 0 → 3 → 6 → 9 (2) | | | | ... shift amount (within upper 7 bits) |

In the shifter 13, in the first stage between the first vertical block width×horizontal pixels (v×h×p), the input data $a_3$ to $a_9$ are first outputted as $b_3$ to $b_9$ as they are. Only the writing operation is executed in the block buffer 5. At the second stage, subsequently, the data is shifted by three bits in the LSB direction, $a_3$ to $a_5$ correspond to highest three bits $b_7$ to $b_9$, and $a_6$ to $a_9$ correspond to $b_3$ to $b_6$. Thus, the reading operation by the block sequence and the writing operation by the raster sequence are executed. At the third and fourth stages, in a manner similar to the above, the shift amount of the shifter 13 is increased every stage by three bits at a time such that 6→9$_{(2)}$→12$_{(5)}$. However, since the actual shift amount is a remainder obtained by dividing the numerical value by 7, the shifting operation is executed such that 6→2→5 . . . .

Figure 9A:
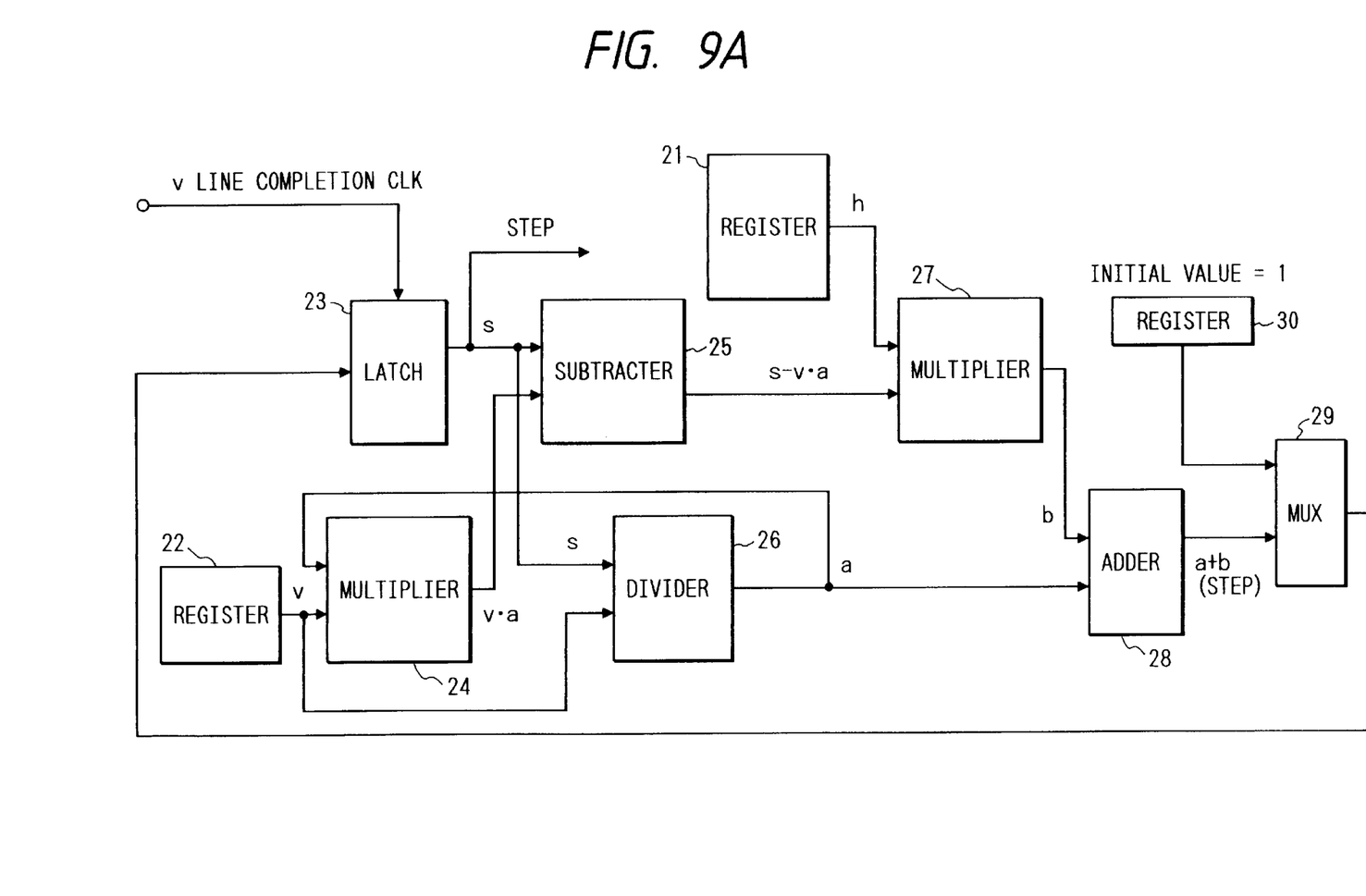
FIGS. 9A and 9B are block diagrams showing examples of other constructions of the address operation unit.
Figure 9B:
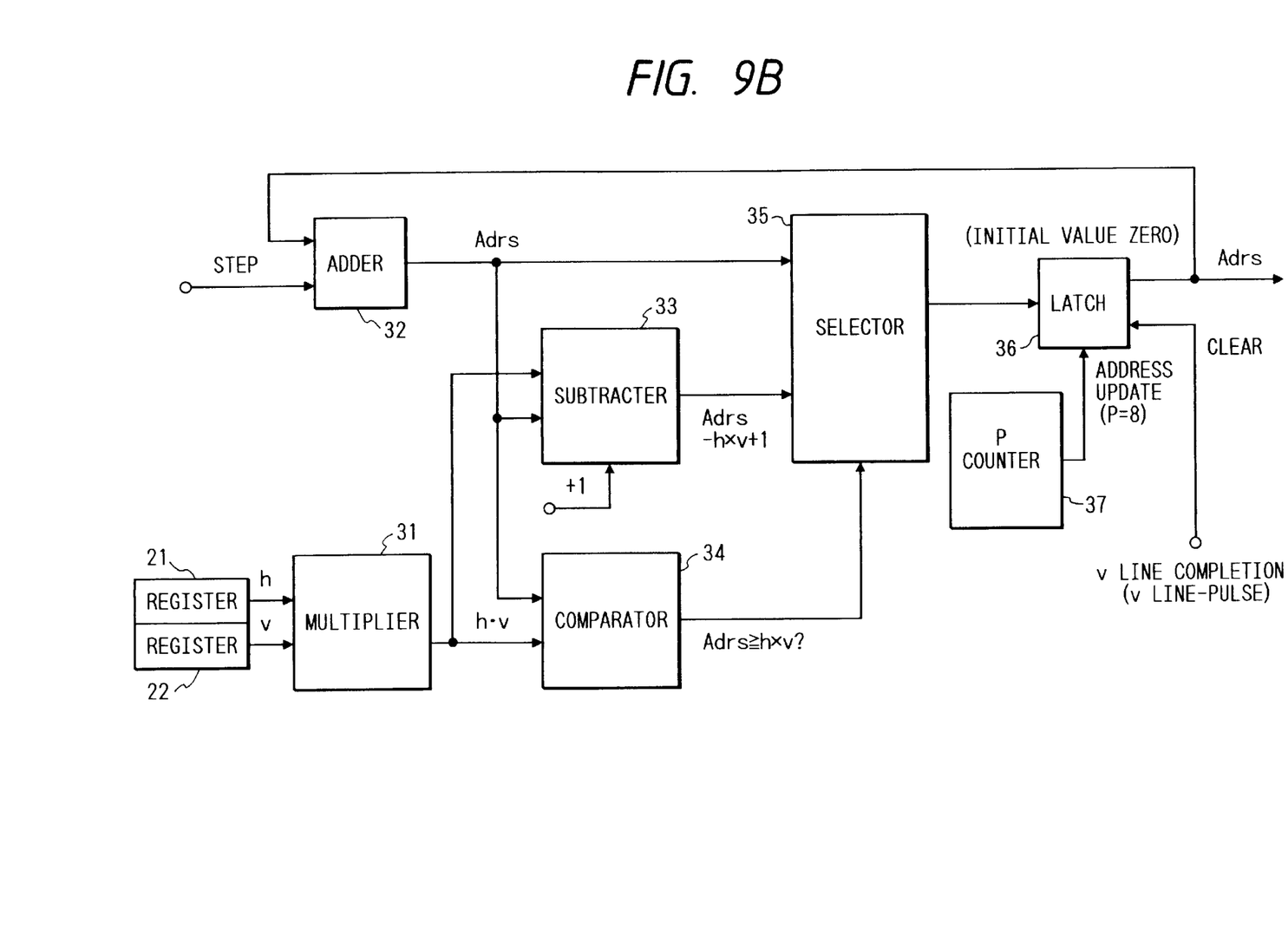

FIGS. 9A and 9B are block diagrams showing another embodiment of the address operation unit 4 based on the principle mentioned above. The address operation unit 4 is constructed by a step calculating unit of FIG. 9A and an Adrs calculating unit of FIG. 9B.

Figure 10:
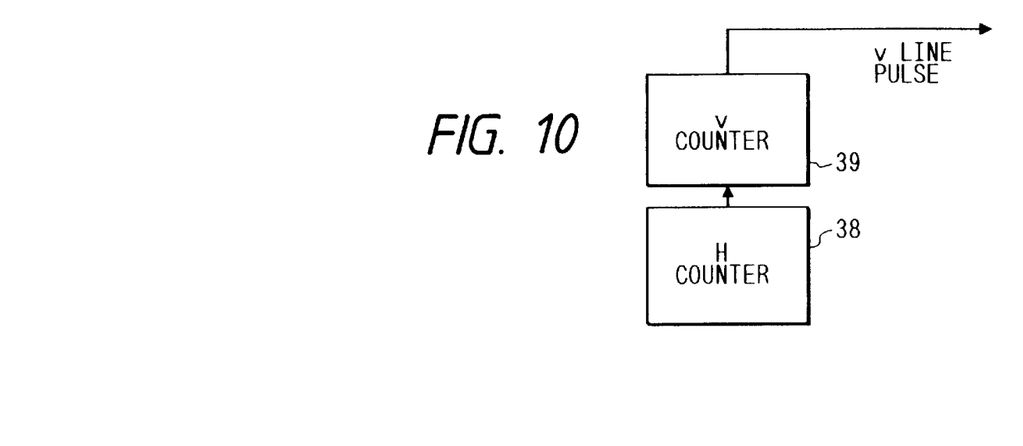
FIG. 10 is a block diagram showing an example of a construction of a v line count completion clock generation unit.

In the first step, an initial value of step=1 which was set in a register 30 of the step calculating unit is first set into a latch 23 through a multiplexer 29 and is sent to the Adrs calculating unit. The latch 23 updates the input value every v (block vertical width) lines in response to a v line completion clock as an output of the comparator 3 in FIG. 4. A v line completion clock generation unit can also generate the v line completion clock every completion of (H×v) pixels by a horizontal counter 38 and a vertical counter 39 as shown in FIG. 10. (This is because H=h×p.) p denotes a horizontal width of one block and h indicates the number of blocks in the horizontal direction (refer to FIG. 5).

An output S (=step) of the latch 23 is also supplied to a subtractor 25 and a divider 26 in the step operation unit. In the divider 26, a calculation of s/v=a is executed by the block vertical width v set in a register 22 and the remainder is omitted. In the multiplier 24, a multiplication of an output a of the divider 26 and v of the register 22 is executed, so that (v×a) is inputted to the subtractor 25. Therefore, (s−v×a) is calculated in the subtractor 25 and is multiplied with the value h of a register 21 in a multiplier 27, so that h×(s−v×a)=b is obtained. In an adder 28, a and b are added and a+b=step is calculated.

$$b = s \times h - h \times v \times a = h \times (s - v \times a)$$

After the second stage, the multiplexer 29 selects an output of the adder 28 and a+b=step is latched in the latch 23 every end of the calculation corresponding to v lines and is updated.

In the Adrs operation unit, the address which is generated in the beginning of each stage mentioned above is obtained by clearing the data in a latch 36 every completion of the calculation corresponding to v lines. An output of the latch 36 is also supplied to an adder 32, by which an addition address Adrs=Adrs+step with the output of the latch 23 is calculated. As for the values h and v of the registers 21 and 22, a calculation of h×v is executed by a multiplier 31. Adrs as an output of the adder 32 and h×v as an output of the multiplier 31 are inputted to both of a comparator 34 and a subtractor 33. In the comparator 34, (Adrs≧h×v) is judged. In the subtractor 33, (Adrs−h×v+1) is calculated. Therefore, an arithmetic operation of +1 is added to the subtractor 33.

The output of the adder 32 and the output of the subtractor 33 are inputted to a selector 35. When (Adrs≧h×v) is judged as a result of judgment of the comparator 34, (Adrs−h×v+1) as an output of the subtractor 33 is outputted as an upper portion of the next address. When a p counter 37 finishes p count, the count value is latched into the latch 36. Therefore, a new upper address Adrs is set every p counts and Adrs and an output of the p counter 37 are added by an adder (not shown) and an addition result becomes an address of the block buffer 5.

In the case where p is the power of "2", namely, when p is equal to 4, 8, or the like, the above addition is unnecessary and an addressing of the block buffer 5 is executed by an address in which Adrs is set to upper bits and the output of the p counter 37 is set to lower bits. The p counter 37 counts up synchronously with a transfer clock of each pixel. In case of reversely converting from the block sequence to the raster sequence, it is sufficient to exchange h and v of the registers 21 and 22 to v and h as already mentioned in the foregoing principle.

In the circuit construction of FIGS. 9A and 9B, a circuit construction in the case where the conversion is executed from the raster sequence to the block sequence and the block vertical width v=8 can be modified as follows. First, the divider 26 can be substituted by a shifter to shift S by three bits in the LSB direction. Second, the multiplier 24 can be substituted by a shifter to shift a by three bits in the MSB direction. Third, the subtractor 25 can be eventually substituted by a circuit for extracting three bits of the LSB of the input S. Thus, the multiplier 24 is actually unnecessary. The circuit construction of the diagram can be substituted by a simple circuit under specific conditions as mentioned above.

According to the embodiment as described above, at each of the conversion from the raster sequence scan to the block sequence scan and the conversion from the block sequence scan to the raster sequence scan, the data is written into the empty addresses which are caused by reading out the block buffer and the access addresses in this instance are calculated by a simple arithmetic operation rule. Thus, the address for conversion from the raster sequence scan to the block sequence scan and the address for conversion from the block sequence scan to the raster sequence scan can be obtained by the same arithmetic operation circuit. In addition, since it is sufficient to prepare one block buffer, there is an advantage such that the circuit scale including the peripheral circuit can be remarkably reduced.

What is claimed is:

1. A memory apparatus for converting an image scan method between a raster sequence scan and a block sequence scan, comprising:

memory means for storing data; and addressing means for addressing said memory means so as to (i) write said data into said memory means block-by-block, by scanning raster sequence or block sequence, and so as to (ii) read said data from said memory means block-by-block, by scanning block sequence or raster sequence corresponding to the writing operation, wherein said addressing means has a comparator for comparing a line control value with a predetermined step and an address generator for generating a read address and a write address based on can output of said comparator.

2. Apparatus according to claim 1, wherein said memory means comprises a SRAM.

3. Apparatus according to claim 1, wherein each block has a size of a predetermined vertical width by a predetermined horizontal width.

4. Apparatus according to claim 3, wherein said read addresses are generated by performing an arithmetic operation using the horizontal width.

5. A scan converting method, comprising the steps of:

a step for writing data into a memory means block-by-block, by scanning raster sequence or block sequence;

a step for subsequently reading the data from said memory means block-by-block, by scanning block sequence or raster sequence corresponding to the writing operation, wherein the writing operation and the reading operation are performed block-by-block in turn, and read addresses are generated by using (i) a comparator for comparing a line control value with a predetermined step and (ii) an address generator for generating a read address and a write address based on an output of the comparator.

6. A method according to claim 5, wherein the reading addresses are generated by performing an arithmetic operation using a predetermined horizontal width of a block.

* * * * *